J. W. BLOOD.
PITMAN CONNECTIONS.
No. 190,733. Patented May 15, 1877.
Fig: 1.
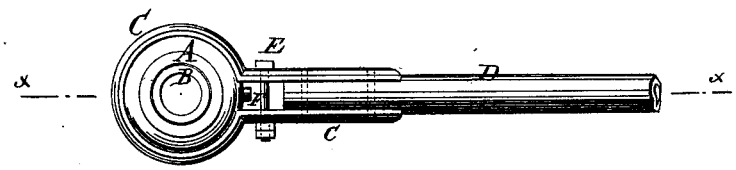
Fig: 2.
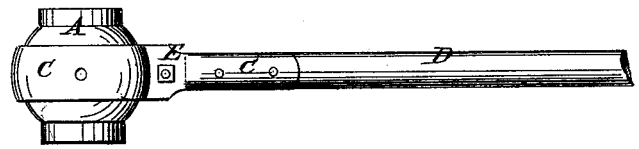
Fig: 3.
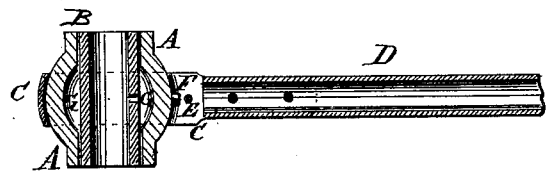
WITNESSES:
Chas. Nida
J. H. Scarborough
INVENTOR:
Jos. W. Blood.
BY
ATTORNEYS.

UNITED STATES PATENT OFFICE.

JOSEPH WARREN BLOOD, OF MINNEAPOLIS, MINNESOTA.

IMPROVEMENT IN PITMAN-CONNECTIONS.

Specification forming part of Letters Patent No. 190,733, dated May 15, 1877; application filed October 14, 1876.

*To all whom it may concern:*

Be it known that I, JOSEPH W. BLOOD, of Minneapolis, in the county of Hennepin and State of Minnesota, have invented a new and useful Improvement in Pitman-Connection, of which the following is a specification:

Figure 1 is a view of one end of a pitman provided with my improved connection. Fig. 2 represents the same turned one-quarter around. Fig. 3 is a longitudinal section of the same, taken through the line $x$ $x$, Fig. 1.

Similar letters of reference indicate corresponding parts.

The object of this invention is to furnish an improved pitman-connection for that class of mowing and reaping machines that have a hinged finger-bar and tilting device, which shall be so constructed as to admit of the different movements which occur while in operation without binding.

The invention will first be described in connection with the drawing, and then pointed out in the claims.

A is the box, which is made globular upon its outer side, and has a hole formed through it to receive a straight pin. The hole through the globular box A is provided with a straight tubular bushing, B, in which the pin works. C is a strap, which passes around and is fitted upon the globular box A. The ends of strap C are secured to the end of the pitman D by bolts or rivets, and through the said strap, between the end of the pitman D and the globular box A, is passed a bolt, E, so that, by tightening the nut of the said bolt, the strap C can be tightened upon the box A, as required. The globular box A is kept from rotating within the strap C by a pin, F, attached to the said box A, between the ends of the strap C, as shown in Figs. 1 and 3. The inner surface of the box A, around the middle part of the bushing B, is concaved to form a ring-chamber, G, to receive and retain the lubricating-oil. The oil is poured into the chamber G through a hole in the box A and strap C, and passes from said chamber to the pin to be lubricated through holes in the bushing B.

The pitman D is made tubular to enable it to be made light, and still have sufficient strength. The connections at the two ends of the pitman D are exactly alike.

I am aware that it is not, broadly, new to use a tubular box with a central ball, the latter confined in a socket, and also with an oil-chamber, but the latter is outside of the ball, while the socket has several slotted openings through which the oil may readily pass out as well as in.

What I claim is—

1. The box A, concaved on the inside about its middle, and fitted tightly at each end about a straight laterally-perforated tube, B, as and for the purpose set forth.

2. The combination, with box A, of the strap C and pitman D, the former passing around the convex middle of box, and clamping the pitman with concave arms, as and for the purpose specified.

JOSEPH WARREN BLOOD.

Witnesses:
GEO. H. RUSH,
C. M. GARFIELD.